United States Patent
Huang et al.

(10) Patent No.: US 10,044,541 B2
(45) Date of Patent: Aug. 7, 2018

(54) MID-PACKET DETECTION OF WI-FI SIGNALS

(71) Applicant: INTEL IP CORPORATION, Santa Clara, CA (US)

(72) Inventors: Po-Kai Huang, Santa Clara, CA (US); Qinghua Li, San Ramone, CA (US); Robert Stacey, Portland, OR (US); Rongzhen Yang, Shanghai (CN); Xiaogang Chen, Beijing (CN); Peng Meng, Shanghai (CN)

(73) Assignee: Intel IP Corporation, Santa Clara, CA (US)

( * ) Notice: Subject to any disclaimer, the term of this patent is extended or adjusted under 35 U.S.C. 154(b) by 166 days.

(21) Appl. No.: 14/867,479

(22) Filed: Sep. 28, 2015

(65) Prior Publication Data

US 2017/0093605 A1   Mar. 30, 2017

(51) Int. Cl.
  *H04L 27/26* (2006.01)
  *H04L 27/00* (2006.01)
  *H04W 84/12* (2009.01)

(52) U.S. Cl.
  CPC ...... *H04L 27/2607* (2013.01); *H04L 27/0006* (2013.01); *H04L 27/2656* (2013.01); *H04L 27/2666* (2013.01); *H04L 27/2671* (2013.01); *H04L 27/2678* (2013.01); *H04W 84/12* (2013.01)

(58) Field of Classification Search
  CPC .............................. H04L 69/22; H04L 1/1832
  See application file for complete search history.

(56) References Cited

U.S. PATENT DOCUMENTS

| | | | | |
|---|---|---|---|---|
| 8,411,807 B1* | 4/2013 | Rangarajan | ............. | H04L 69/22 375/316 |
| 2009/0041135 A1* | 2/2009 | Ismail | ................. | H04L 27/2678 375/260 |
| 2016/0087826 A1* | 3/2016 | Huang | ................ | H04L 27/0006 375/316 |
| 2016/0119452 A1* | 4/2016 | Lee | ......................... | H04L 69/10 370/338 |
| 2017/0237521 A1* | 8/2017 | Hong | .................... | H04L 1/0023 375/260 |

\* cited by examiner

*Primary Examiner* — Shukri Taha
(74) *Attorney, Agent, or Firm* — Eversheds Sutherland (US) LLP

(57) ABSTRACT

This disclosure describes systems, methods, and computer-readable media related to phishing and brand protection via copycat detection. In some embodiments, a plurality of Orthogonal Frequency Division Multiplexing (OFDM) symbol durations may be determined. A plurality of data streams may be generated by executing a plurality of sliding window operations using a respective shifting window for each of the plurality of OFDM symbol durations. Each of the plurality of data streams may be dissected into a respective plurality of segments using a total number of cyclic prefix (CP) lengths associated with the respective shifting window, wherein each segment of the respective plurality of segments is a vector. A plurality of vector sums corresponding to each of the plurality of data streams may be determined. A Wi-Fi signal may be detected when one of the plurality of vector sums exceeds a threshold.

20 Claims, 10 Drawing Sheets

US 10,044,541 B2

MID-PACKET DETECTION OF WI-FI SIGNALS

TECHNICAL FIELD

Example embodiments disclosed generally relate to mid-packet detection of Wi-Fi signals.

BACKGROUND

A next generation WLAN, IEEE 802.11ax or High-Efficiency WLAN (HEW), is under development. Uplink multiuser MIMO (UL MU-MIMO) and Orthogonal Frequency-Division Multiple Access (OFDMA) are two major features included in the new standard. For both features, however, the Access Point (AP) needs to schedule the transmissions or receptions of multiple users. This may require the AP to have channel status knowledge comprising Clear Channel Assessment (CCA) and buffer status of the user communication stations (STAs).

DETAILED DESCRIPTION

Figure 1:
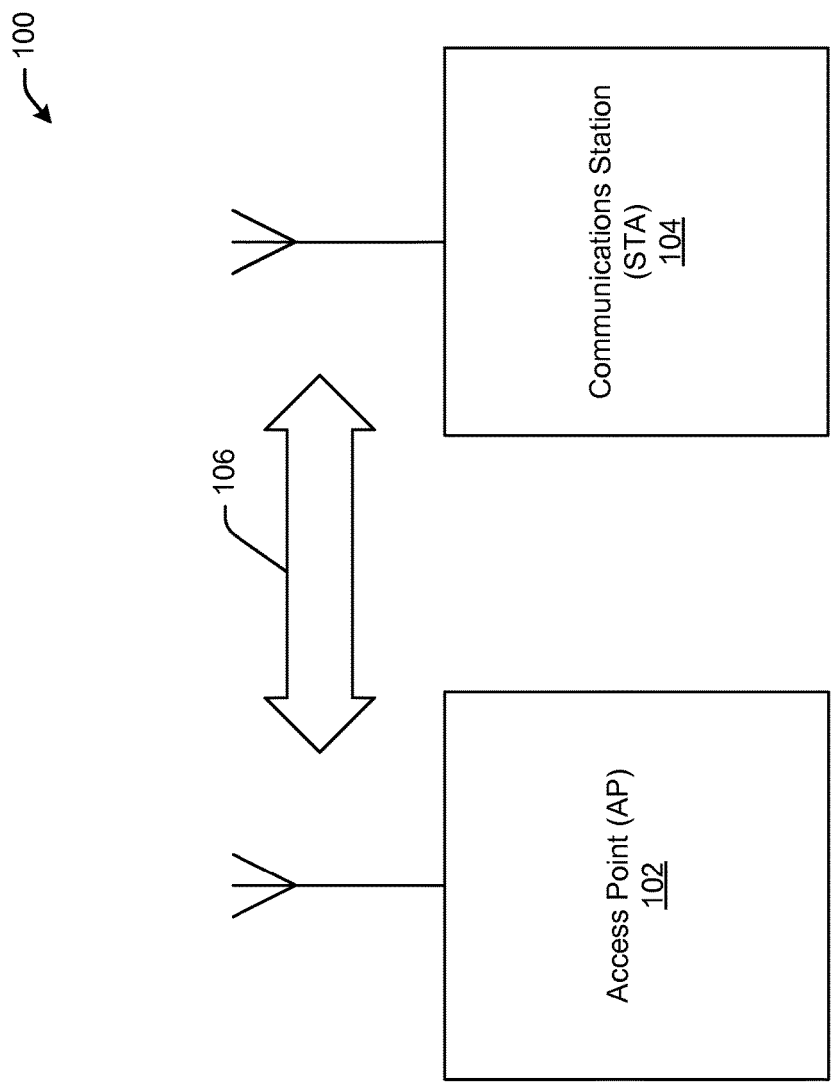
FIG. 1 is a network diagram illustrating an example network environment, according to one or more example embodiments.

Embodiments of the disclosure relate to systems, method, and devices for mid-packet detection of Wi-Fi signals. Wi-Fi transmissions may be asynchronous. A receiver may rely on a preamble of a packet to detect the start of the packet, determine the packet duration, decode desired transmission, and defer for undesired transmission. The receiver may be able to identify the Wi-Fi transmissions to defer for the existing transmissions or should be able to transmit to achieve spatial reuse. However, in a dense environment, there may be many overlapping basic service set (OBSS) transmissions. Hence, it is possible for the preamble to have errors, and Wi-Fi devices may not be able to identify the existing transmissions and may have to use higher energy detection levels to sense the spectrum and avoid non-Wi-Fi transmissions.

Mid-packet detection was proposed for secondary channel Clear Channel Assessment (CCA) in 802.11ac. However, the mid-packet detection may not properly work with a 4× symbol duration. In some embodiments, the symbol may be an orthogonal frequency division multiple access (OFDMA) symbol.

In some embodiments, since the symbol duration will be four times longer for 802.11ax baseline modes and the cyclic prefix (CP) length does not proportionally increase, the detection window for mid-packet detection may be extended from the legacy 25 microseconds to a longer time (e.g., 40-60 microseconds) for achieving the same false alarm rate and miss detection rate.

In some embodiments, the deferral procedure on the primary channel may defer for shorter time than the sensing time of the secondary channel, some modification in the primary channel for sensing and back off may be necessary.

In some embodiments, mid-packet detection operations may consider multiple symbol durations and CP lengths with low complexity. The mid-packet detection operations may not need to be implemented or executed constantly. Additionally, the mid-packet detection window may not need to be implemented for all the CP lengths. In some embodiments, the CCA sensing time for the secondary channel may be dynamically adjusted based on different factors.

Details of one or more implementations are set forth in the accompanying drawings and in the description below. Further embodiments, features, and aspects will become apparent from the description, the drawings, and the claims.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The terms "communication station", "station", "handheld device", "mobile device", "wireless device" and "user equipment" (UE), as used herein, refer to a wireless communication device such as a cellular telephone, smartphone, tablet, netbook, wireless terminal, laptop computer, a wearable computer device, a femtocell, High Data Rate (HDR) subscriber station, access point, access terminal, or other personal communication system (PCS) device. The device may be either mobile or stationary.

The term "access point" (AP) as used herein may be a fixed station or another mobile station. An access point may also be referred to as an access node, a base station or some other similar terminology known in the art. An access point may also be called a mobile station, a user equipment (UE), a wireless communication device or some other similar terminology known in the art. Both communication station and the access point may simply be referred to as a device in the present disclosure. Embodiments disclosed herein generally pertain to wireless networks. Some embodiments can relate to wireless networks that operate in accordance with one of the IEEE 802.11 standards including the IEEE 802.1 lax standard.

The term "data symbol" may represent the portion of an symbol without cyclic prefix.

The term "OFDM symbol duration" may be equal to a CP length plus an OFDM data symbol duration.

FIG. 1 is a network diagram illustrating an example network environment 100 suitable for mid-packet detection of Wi-Fi signals, according to some example embodiments. Wireless network 106 may include one or more communication stations (STAs) 104 and one or more access points (APs) 102, which may communicate in accordance with IEEE 802.11 communication techniques. The communication stations 104 may be mobile devices that are non-stationary and do not have fixed locations. The one or more APs may be stationary and have fixed locations. The stations may include an AP communication station (AP) 102 and one or more responding communication stations STAs 104.

In accordance with some IEEE 802.11ax (High-Efficiency Wi-Fi (HEW)) embodiments, an access point may operate as a master station which may be arranged to contend for a wireless medium (e.g., during a contention period) to receive exclusive control of the medium for a HEW control period (i.e., a transmission opportunity (TXOP)). The master station may transmit a HEW master-sync transmission at the beginning of the HEW control period. During the HEW control period, HEW stations may communicate with the master station in accordance with a non-contention based multiple access technique. This is unlike conventional Wi-Fi communications in which devices communicate in accordance with a contention-based communication technique, rather than a multiple access technique. During the HEW control period, the master station may communicate with HEW stations using one or more HEW frames. Furthermore, during the HEW control period, legacy stations refrain from communicating. In some embodiments, the master-sync transmission may be referred to as a HEW control and schedule transmission.

In some embodiments, the multiple-access technique used during the HEW control period may be a scheduled orthogonal frequency division multiple access (OFDMA) technique, although this is not a requirement. In other embodiments, the multiple access technique may be a time-division multiple access (TDMA) technique or a frequency division multiple access (FDMA) technique. In certain embodiments, the multiple access technique may be a space-division multiple access (SDMA) technique.

The master station may also communicate with legacy stations in accordance with legacy IEEE 802.11 communication techniques. In some embodiments, the master station may also be configurable to communicate with HEW stations outside the HEW control period in accordance with legacy IEEE 802.11 communication techniques, although this is not a requirement.

In other embodiments, the links of a HEW frame may be configurable to have the same bandwidth and the bandwidth may be one of 20 MHz, 40 MHz, or 80 MHz contiguous bandwidths or an 80+80 MHz (160 MHz) non-contiguous bandwidth. In certain embodiments, a 320 MHz contiguous bandwidth may be used. In other embodiments, bandwidths of 5 MHz and/or 10 MHz may also be used. In these embodiments, each link of a HEW frame may be configured for transmitting a number of spatial streams.

Although Downlink Multiuser MIMO (DL MU-MIMO) was introduced to Wi-Fi in 802.11ac, features to prevent reception jamming caused by incorrect channel status assumptions were not addressed. There is no channel reservation scheme for DL MU-MIMO reception in existing Wi-Fi. Additionally, there is no polling scheme known in Wi-Fi for multiuser scheduling. Without protecting the receiver and polling the receiver, the system throughput can be lower than that with the protection/poll by 2× and more for long packets.

In certain of these scenarios, the access point (AP) sees an idle channel and directly sends downlink MU-MIMO data to the scheduled stations (STAs) without checking the channel statuses of the STAs. Reception of the DL MU-MIMO data is properly received only if the channel statuses of the access point (AP) and the receive station (STA) are identical. If the AP sees an idle channel but the scheduled communication station STA 104 does not, the downlink reception at the communication station STA 104 is subject to interference, similar to interference resulting from transmitting a data packet without RTS/CTS protection in legacy Wi-Fi. Transmission of short packets may not result in interference. However, for long packets such as the aggregated packets having 3-4 microseconds (ms) transmission durations, the throughput without the RTS/CTS protection is much lower than that with the RTS/CTS protection.

OFDMA is another feature of 802.11ax. OFDMA can experience reception jamming if the AP 102 does not know the CCA status of the communication station STA 104 or the STA does not reserve the channel for receiving long packets. The example systems, methods, and devices disclosed herein use novel and inventive mechanisms to identify Wi-Fi transmission without the need for preamble detection. According to one example embodiment, the systems, methods, and devices described may enable the detection of Wi-Fi signals in the absence of a Wi-Fi preamble such that a threshold lower than −62 dBm, for example, −82 dBm may be used in an OBSS. According to one example embodiment, the systems, methods, and devices described may detect the repetition of cyclic prefixes (CP) at the beginning and end of each orthogonal frequency division multiplexing (OFDM) symbol. According to another example embodiment, the systems, methods, and devices described may detect the pilot signal at the pilot tones of Wi-Fi. According to another example embodiment, the systems, methods, and devices may detect the OFDM subcarrier structure of Wi-Fi whose signal energy concentrates on the evenly spaced frequency points with known subcarrier spacing, DC subcarrier null, and guard band edges. Orthogonal Frequency-Division Multiple Access (OFDMA) is a multi-user version of the popular orthogonal frequency-division multiplexing (OFDM) digital modulation scheme. Multiple access is achieved in OFDMA by assigning subsets of subcarriers to individual users, for example, which allows simultaneous low data rate transmission from several users, for example.

Figure 2:
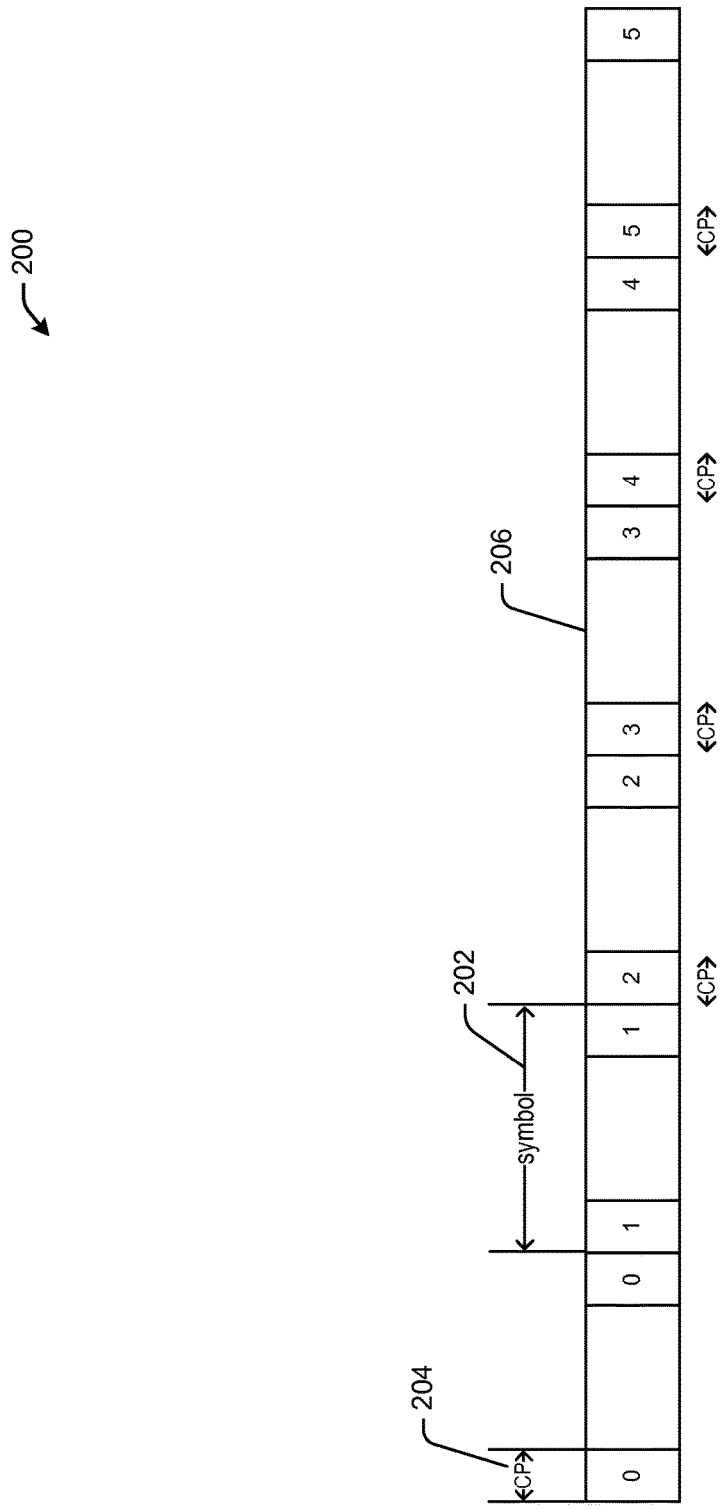
FIG. 2 illustrates symbols in a time domain for a Wi-Fi transmission, according to one or more example embodiments.

Wi-Fi transmissions in general use OFDM technology and have repetition patterns due to a CP. For example, FIG. 2 shows a plurality of transmitted symbols 202 in a time domain for a Wi-Fi transmission 200. As shown in FIG. 2, each OFDM symbol 202 can include two CPs 204, one at the beginning of each symbol 202 and one at the end of the symbol. The two CPs 204 may be separated by the data 206 contained in the symbol 202, for example. In a Wi-Fi transmission, for example, a symbol duration 'L' may be 4 μs, for example. The length of the CP 'C' may be 0.8 μs, for example. However, it should be noted that 'L' can be 3.6 μs with a 'C' of 0.4 μs, for example, for legacy 802.11a/n/ac standards, an 'L' could be 16 μs with a 'C' of 1.6 μs for future 802.11ax standards. The example embodiments described herein are however not limited to these values and may be applied to Wi-Fi transmissions of any length.

Figure 3:
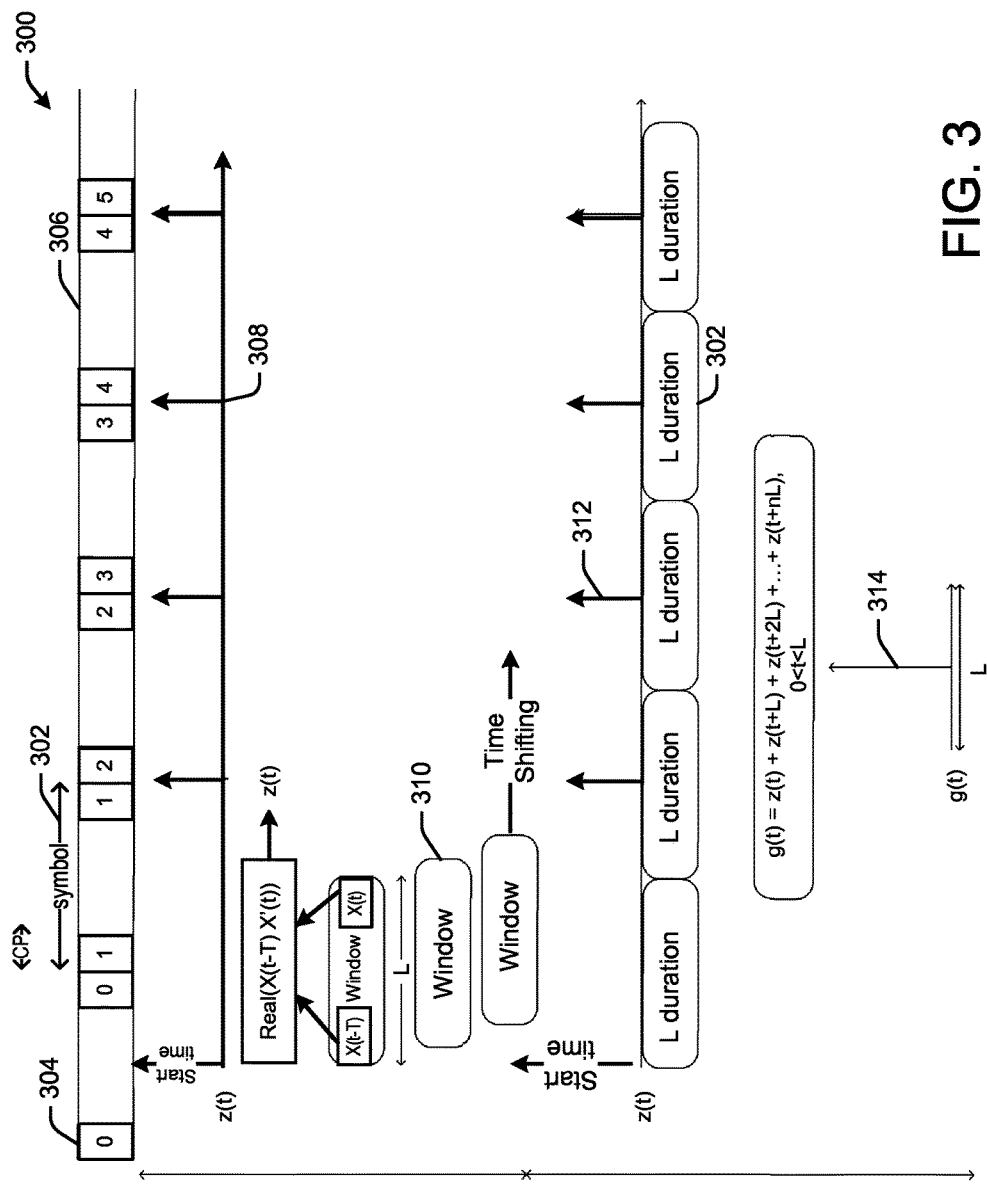
FIG. 3 illustrates an example of sequence of operations in a time domain for a Wi-Fi transmission, according to one or more example embodiments.

Turning now to FIG. 3, in one example embodiment, the systems, methods, and devices described may use a CP 304 with a length 'C' of 0.8 μs, for example. Wi-Fi transmission 300 may include a plurality of symbols 302 with symbol duration 'L', such as data 306, which may be positioned between two CPs 304. Two copies of a CP 304 may be associated with a symbol 302, one copy marking the beginning of the symbol and one copy marking the end of a symbol. The CPs 304 may be used to match against the copy. Since the two copies 304 are 3.2 μs apart in time, a sliding window 310 may be used with 0.8 μs samples coming in 3.2 μs later or earlier. The matched filter output can deliver a plurality of peaks 308 when the sliding window 310 and CP 304 coincide. Since the CP 304 duration is only one fourth of the symbol 302 duration and it may be corrupted by multiple paths, the energy collected by the matched filter and its reliability may be limited. For enhancement, multiple peaks 312 of the matched filter output, which may be 4 μs apart, may be combined to produce a larger peak 314 that may be easily identifiable. A high level example is shown in FIG. 3, where a Wi-Fi device identifies a Wi-Fi transmission using a larger peak 314, for example.

In some embodiments, mid-packet detection may consist of two steps. In the first step, a window may shift over samples to create z(t). In the second step, the results are summed over multiple symbol durations. In some embodiments, the mid-packet detect operation may not need to be constantly executed because the device may only need to perform mid-packet detection when the device needs to contend for the medium. If the device is currently deferring due to decode on OBSS L-SIG or NAV setting, then the device may not need to perform the mid-packet detection.

Figure 4A:
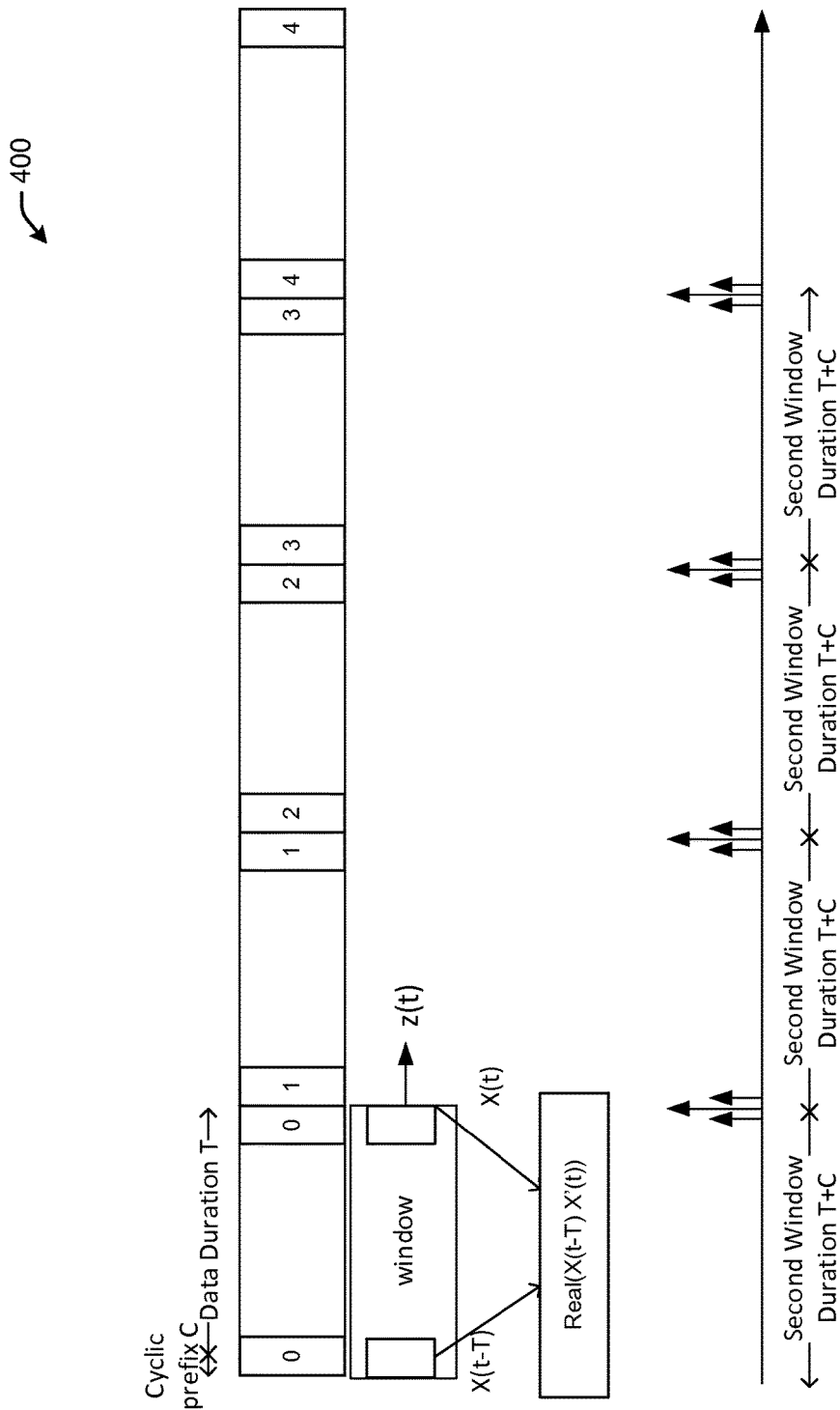
FIGS. 4A-4C illustrate examples of sequence of operations in a time domain for a Wi-Fi transmission with multiple cyclic prefix lengths for Wi-Fi signals, according to one or more example embodiments.
Figure 4B:
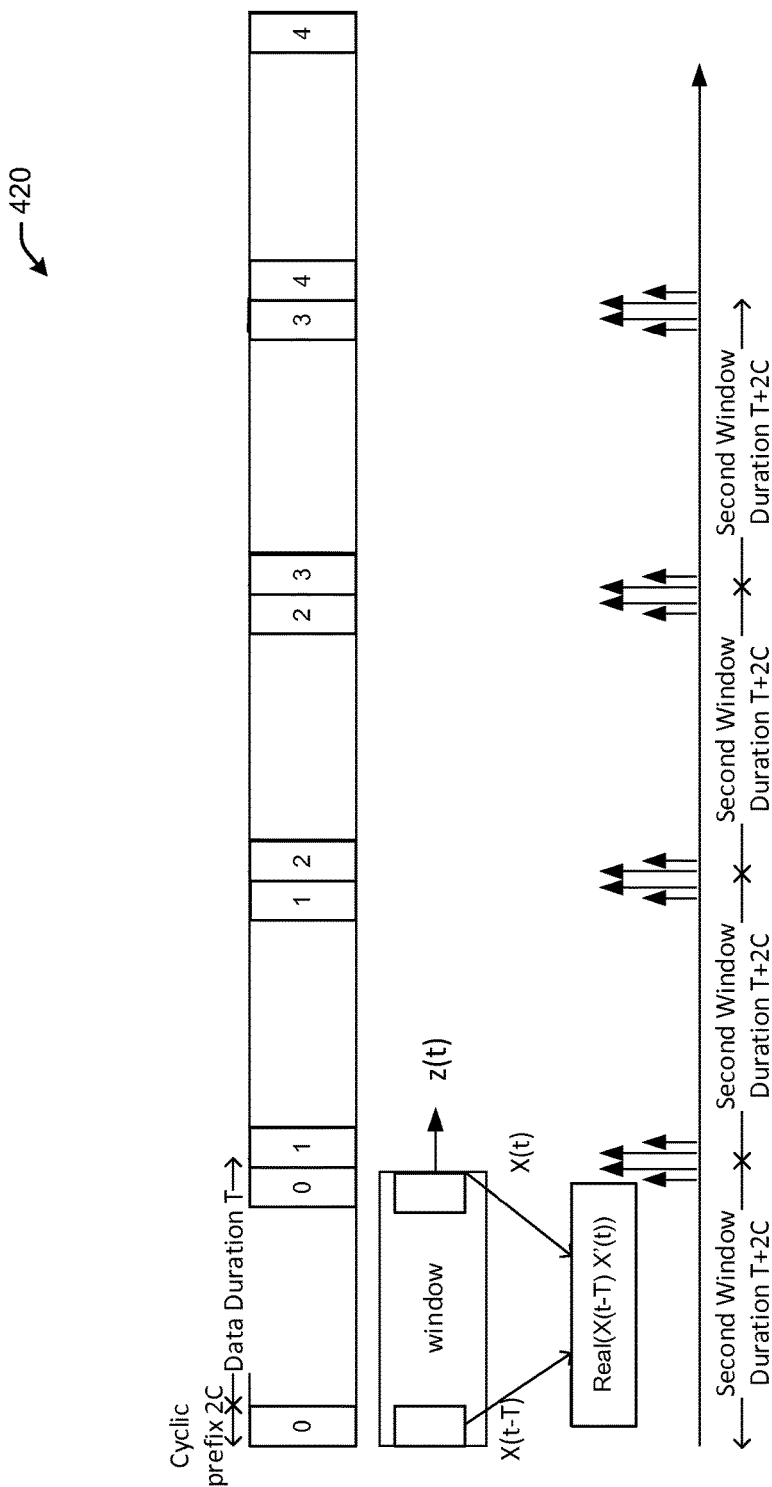
Figure 4C:
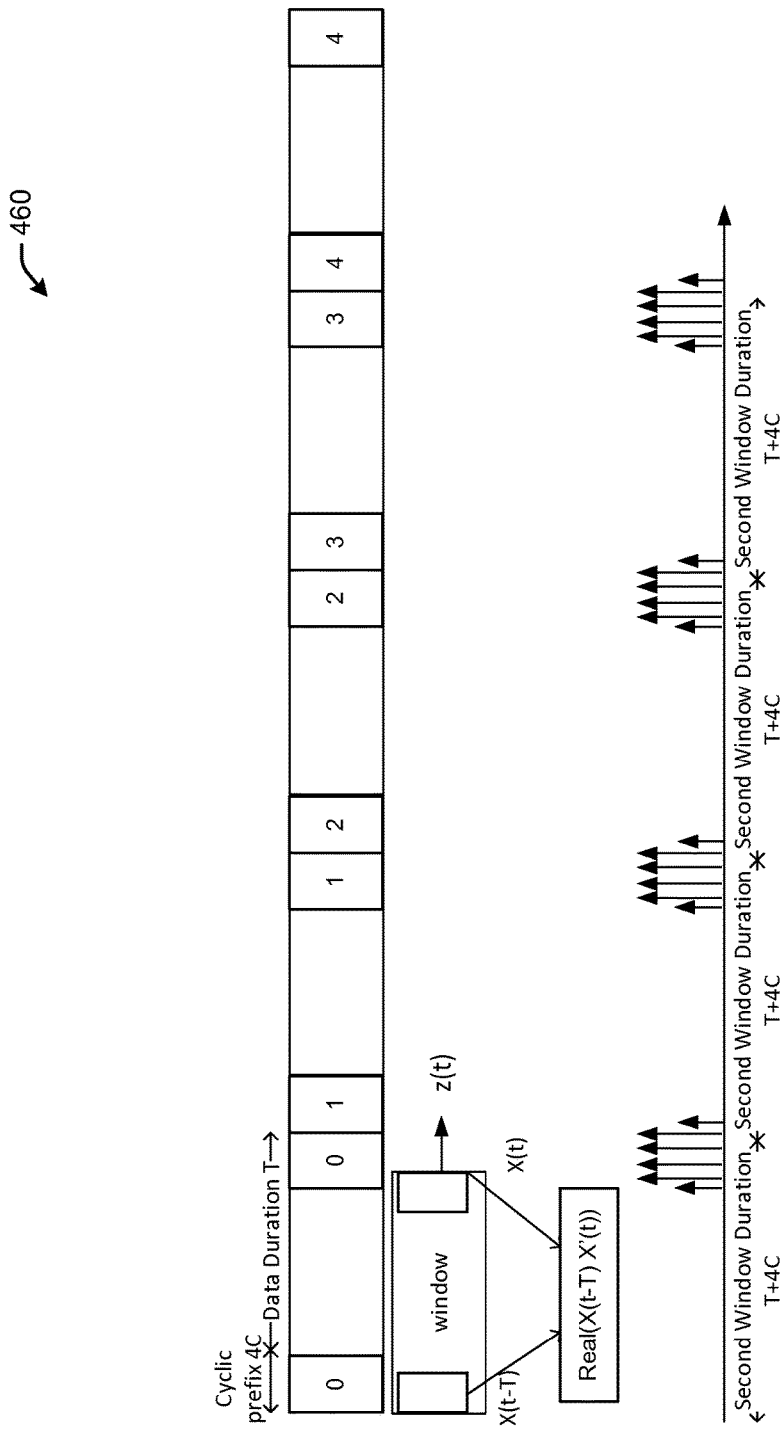

Now turning to FIGS. 4A-4C, in some embodiments, the 802.11 specification may indicate multiple CP lengths (e.g., 0.4 μs, 0.8 μs, 1.6 μs, and 3.2 μs). For example, when the data symbol duration is 12.8 μs, the CP length may be 0.8 μs, 1.6 μs, or 3.2 μs. When the data symbol duration is 3.2 μs, the CP length may be 0.4 μs and 0.8 μs. Without special implementation, five windows and shifting may be needed to differentiate all five possible cases. However, this may be simplified to two windows shifting, as depicted in FIGS. 4A-4C.

Consider the possible cases of 12.8 μs data symbol duration with 0.8 μs, 1.6 μs, or 3.2 μs CP length. A window with length 13.6 μs may be constructed to obtain z(t) of a 13.6 μs Wi-Fi symbol with 0.8 μs CP as shown in FIG. 4A. Now for 14.4 μs Wi-Fi symbol with 1.6 μs CP, the same window may be used to obtain Z(t) as shown in FIG. 4B. FIG. 4C depicts an example for 16 μs Wi-Fi symbol with 3.2 μs CP. By using a smaller window (compared to the symbol duration) with the smaller x(t) duration (compared with CP length), may generate a series of peaks, as depicted in FIGS. 4B-4C. If a window with a length equal to the symbol duration is used with x(t) duration equal to the CP length, then only one peak may be generated, as depicted in FIG. 4A. Accordingly, one window with a length equal to the sum of smaller CP lengths plus the data symbol duration may be sufficient to provide the peak. A series of data across time may be collected, and three different second windows (e.g., step 2 in FIG. 3) may equal the length of three different symbol sizes that can be used to dissect the data across time and sum data together to get the peaks as show in FIGS. 4A-4C.

Additionally, because a smaller value of x(t) duration is used to compare with the duration of CP, the peak of the symbol duration with length T+2C and T+4C may not be the maximum peak, where T is the data symbol duration corresponding to the window shifting operation. However, additional adders may be used to compensate for the loss. Specifically, the case for T+2C, after the sum for the second window duration is executed, the peak for each sample 's' may be recalculated as:

$P(s)=P(s)+P(s+C/50 \text{ ns mod}(T+2C)/50 \text{ ns})$.

Similarly, for the case of T+4C, after the sum for the second window duration is executed, the peak for each sample 's' may be recalculated as:

$P(s)=P(s)+P(s+C/50 \text{ ns mod}(T+4C)/50 \text{ ns})+P(s+2C/50 \text{ ns mod}(T+4C)/50 \text{ ns})+P(s+3C/50 \text{ ns mod}(T+4C)/50 \text{ ns})$.

In some embodiments, one circuitry may be needed for a multiplication operation to obtain a series of peak values with different CP sizes. Then three simple circuitries for adding operations may be used to obtain the final peak.

In some embodiments, a duration of 25 μs may be used for Clear Channel Assessment (CCA) sensing based on mid-packet detection operations. In some embodiments, approximately six symbols may be used for mid-packet detect operations. When the CP length is 0.4 μs, this implies that only 48 samples are used for mid-packet detection. When the data symbol duration is 12.8 μs, and the CP length is 0.8 μs for each symbol (i.e. 13.6 μs), 16 samples may be used, in which case three complete symbols may be needed (e.g., 40.8 μs) to get 48 samples. If the possible missing duration of 12.8 μs of the starting symbol is added, then there are 53.6 μs. Hence, it may be determined that the CCA sensing time under 4× symbol duration is approximately 54 μs.

Figure 5:
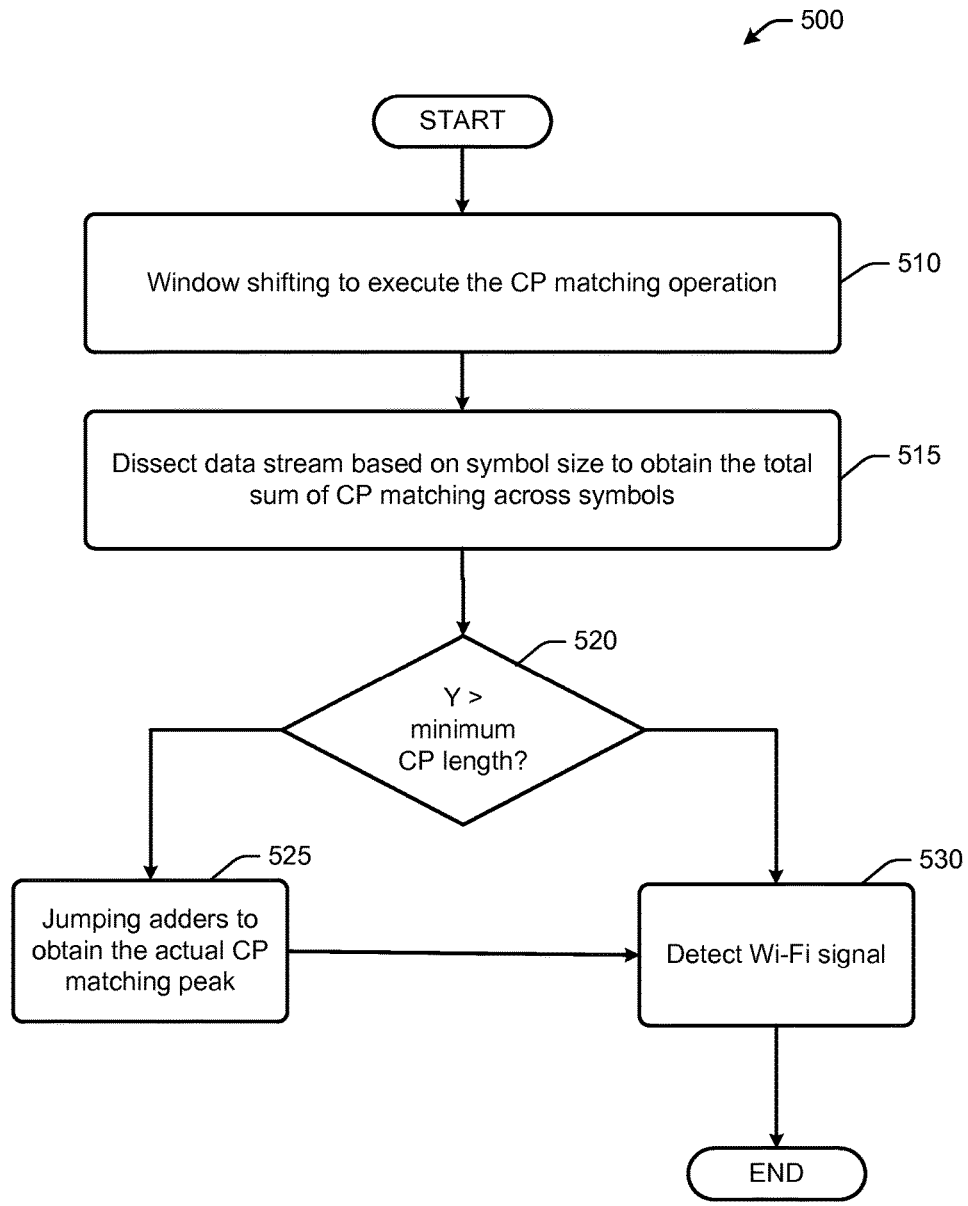
FIG. 5 illustrates example operations in a method for use in systems and devices, according to one or more example embodiments.

Turning now to FIG. 5, FIG. 5 illustrates example operations involved in an example method 500 that may be implemented on the systems and devices for mid-packet detection of Wi-Fi signals. At block 510, a window shifting operation may be executed to perform CP matching operations. For example, if the start time is the time that a Wi-Fi device may need to reaccess the channels, then it may use a window with length equal to the symbol duration to match an end portion with duration 'C,' for example X(t), with the beginning portion of duration 'C,' for example, X(t−T), to generate z(t)=Real(X(t)X'(t−T)). Then it may shift the window to create the z(t) at a different time point. When the window matches a symbol, there may be an energy peak. In some embodiments, the Wi-Fi device may maintain one shifting window for each data symbol duration, such as an OFDM symbol duration. For example, if it is determined that there are two data symbol durations (e.g., 3.2 μs or 12.8 μs), two shifting windows may be maintained by the Wi-Fi device. For each shifting window, the length may be equal to the data symbol duration plus the minimum CP length associated with the shifting window, which may be represented by 'M'. For example, if the CP lengths for the 12.8 μs data symbol duration are 0.8 μs, 1.6 μs, and 3.2 μs, the window length may be 13.6 μs (e.g., 12.8 μs+0.8 μs). In some embodiments, the operation in each shifting may be executed in parallel. In some embodiments, each shifting window may produce a series of data streams. The Wi-Fi device may stop the window shifting operation of a larger window length if the window shifting operation of a smaller window length has a positive indication (e.g., Wi-Fi signal detected) after completion of the method 500.

At block 515, each of the data streams may be dissected or divided into a respective plurality of segments based on the data symbol size to obtain the total sum of CP matching across data symbols. For example, z(t) may be divided into durations equal to symbol duration starting from the starting time. Then the results of this symbol duration may be summed up. Accordingly, multiple energy peaks may add up to a larger peak, and the interference may cancel each other. The number 'n' may determine the number of symbol durations for z(t) that may needed to be added up. This may represent the delay to identify the existing Wi-Fi transmission, and the delay may be small. For example, if n=5 and the symbol duration is 4 μs, then the delay is only 20 μs. If there is a large energy peak after adding up, then the example systems, methods, and devices described may identify a Wi-Fi transmission. According to one example embodiment, the energy for the decision may be controlled by a threshold. It should be noted however that the identification of an existing Wi-Fi transmission could also be combined with back-off. For example, devices can do the back-off while identifying the Wi-Fi transmissions. If the Wi-Fi transmissions are identified after back-off 2 slots, then elapse 2 slots can be added back to the back-off counter. Accordingly, there may be no delay for identifying the existing Wi-Fi transmissions if the back-off window is larger than 3, for example.

It should be noted however that even if there are more than one Wi-Fi transmissions, then there may be more than one peaks. In this case, a device can still identify that there may be existing transmissions. It should also be noted that the Wi-Fi devices may need to continue to have these calculations so that it may know if the Wi-Fi signals have ended, and the energy is from the non-Wi-Fi signals. A condition might however exist if the energy peak of g(t) for the last 'n' simple duration is less than some threshold, then it may think there are no Wi-Fi transmissions and may use −62 dBm for ED.

In some embodiments, for each data stream produced by a window shifting operation, 'X' parallel operations may be performed, where 'X' is equal to the number of CP lengths corresponding to the data symbol length of the window shifting operation. For example, if the CP length for a 12.8 μs data symbol are 0.8 μs, 1.6 μs, and 3.2 μs, then X=3.

In some embodiments, each parallel operation is done for a CP length represented by 'Y'. For each parallel operation, the data streams may be dissected into segments with lengths equal to T+Y, where T is the data symbol duration corresponding to the window shifting operation. For example, if the CP length is 0.8 μs and the data symbol duration is 12.8 μs, then the segment length is 13.6 μs. In some embodiments, for each parallel operation, the segments of the dissected data streams may be viewed as vectors. For $V_i$ for segment i, a vector sum may be performed for every segment (e.g., vector $V=\Sigma_i V_i$ At block 520, a determination may be made to determine if Y is greater than a minimum CP length for the respective shifting window.

If Y is less than or equal to the minimum CP length, the method 500 may proceed to block 530, where it is determined that a Wi-Fi signal is detected by comparing the vector sum to a threshold and determining the vector sum exceeds the threshold.

If Y is greater than the minimum CP length, the method may proceed to block 525. At block 525, jumping adder operations may be performed to obtain the actual CP matching peak. After the vector sum, if the corresponding CP length Y is larger than the minimum CP length M of the corresponding data symbol length, then a jumping adder operation may be executed for each element of summing vector V. Specifically, for element i of V, let Z=Y/M and $$V(i)=V(i)+V(I+M/50 \text{ ns mod}(T+Y)/50 \text{ ns})+ \ldots +V(I+(Z-1)M/50 \text{ ns mod}(T+Y)/50 \text{ ns}).$$

The vector after performing the jumping adder operation may be represented by Vf. The maximum element of Vf may be obtained. The method may proceed to block 530, where the Vf may be compared with a threshold to indicate if a Wi-Fi signal is detected. If a Wi-Fi signal is detected, average power of the Wi-Fi signal may be computed and compare it with a mid-packet detection clear channel assessment threshold.

In some embodiments, a jumping adder operation may be executed for each CP length associated with the shifting window, where the CP length is larger than the minimum CP length. Each jumping adder operation may generate an additional data stream. Each additional data stream generated may be dissected into a plurality of segments using a duration equal to the CP length corresponding to the data stream plus the OFDM data symbol duration associated with the shifting window. The each segment of the plurality of segments may be a vector and a plurality of vector sums corresponding to each of the plurality of data streams may be obtained. A Wi-Fi signal may be detected when one of the plurality of vector sums exceeds a threshold.

Figure 6:
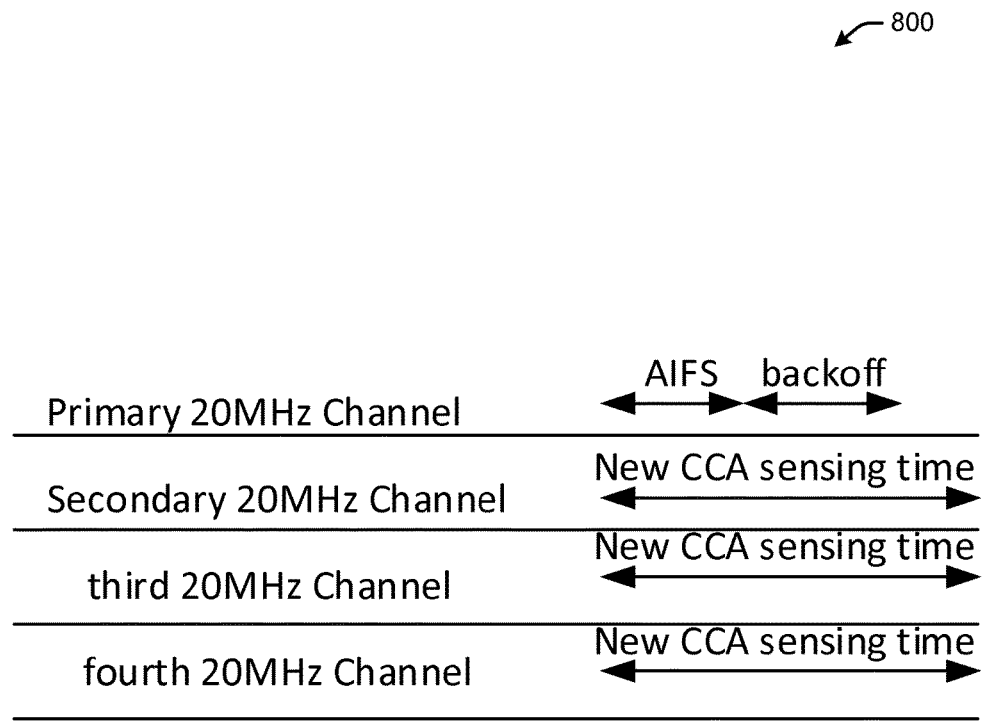
FIG. 6 illustrates an example of dynamic sensing durations in a secondary channel, according to one or more example embodiments.

Turning now to FIG. 6, FIG. 6 illustrates an example 600 of dynamic sensing durations in a secondary channel, according to one or more example embodiments. In an example embodiment, a Clear Channel Assessment (CCA) sensing duration in a 20 MHz channel may be determined if mid-packet detection is required. In some embodiments, the number of samples required for CP matching may be represented by 'X', the maximum of data symbol duration may be represented by 'M', and the minimum CP length of the maximum data symbol duration may be represented by 'm'. In some embodiments, the CCA sensing duration may be determined using the formula: ceil(ceil(X*50 ns/m)*(M+m)+M). In some embodiments, the value of X may depend on the agreement between companies or based on the current requirement in the secondary channel. In some embodiments, it may be possible that when a mid-packet detect threshold is larger, the sensing time can be smaller, which may indicate that the sensing time may be dynamically based on the corresponding mid-packet detect threshold. In some embodiments, it may be possible that the group may accept a lower probability of detection (e.g., 80% rather than 90%), which may indicate that the sensing time may be dynamically based on the corresponding detection probability.

In the example embodiment, the current CCA sensing duration in a secondary 20 MHz channel may be PIFS=25 μs. In some embodiments, the 802.11 specification may specify that devices will defer until their mid-packet detection circuitry can indicate a high confidence indication rather than specify an exact duration.

In some embodiments, the secondary channel may need to sense a longer time than the back-off operation in the primary channel, as shown in FIG. 6. In some embodiments, a dynamic sensing time increase may be implemented if the mid-packet detection mechanism is only used outside the primary 20 MHz channel. In some embodiments, if the new CCA sensing time is longer than the required inter-frame space (IFS) before back-off, then the station may dynamically extend the IFS before the back off time:

New IFS>=New CCA sensing time−back-off time, and
New IFS=Short IFS+n*slot_time for some n.

In some embodiments, the mechanism to dynamically extend the IFS may not be required if the back-off time is longer than the New CCA sensing time. In some embodiments, the station may also use shorter sensing time to accommodate the available time for sensing.

In some embodiments, if the mid-packet detection mechanism is on the primary channel, then the inter frame spacing on the primary channel may need to be longer than the new CCA sensing time if the mid-packet detection is required for using the corresponding inter frame spacing. In some embodiments, the station may dynamically increase the IFS by using the following:

New IFS>=New CCA sensing time−back-off time if the New CCA sensing time >back off time and New IFS=SIFS+n*slot_time for some n; or New IFS=Old IFS if New CCA time <=back off time and if the medium is detected busy in the middle of back-off, then the station may start to defer and the back-off counter may be restored to the value of the back-off counter before deferral.

In some embodiments, AP 102 may have the capability to signal if the network is using four times symbol duration. If the AP 102 signals that the network will not use 4 times symbol duration, Priority IFS (PIFS) CCA sensing time may be used outside the 20 MHz primary channel. In some embodiments, if the AP 102 signals that the network will not use 4 times symbol duration, the sensing time on the primary channel may not need to be changed.

Figure 7:
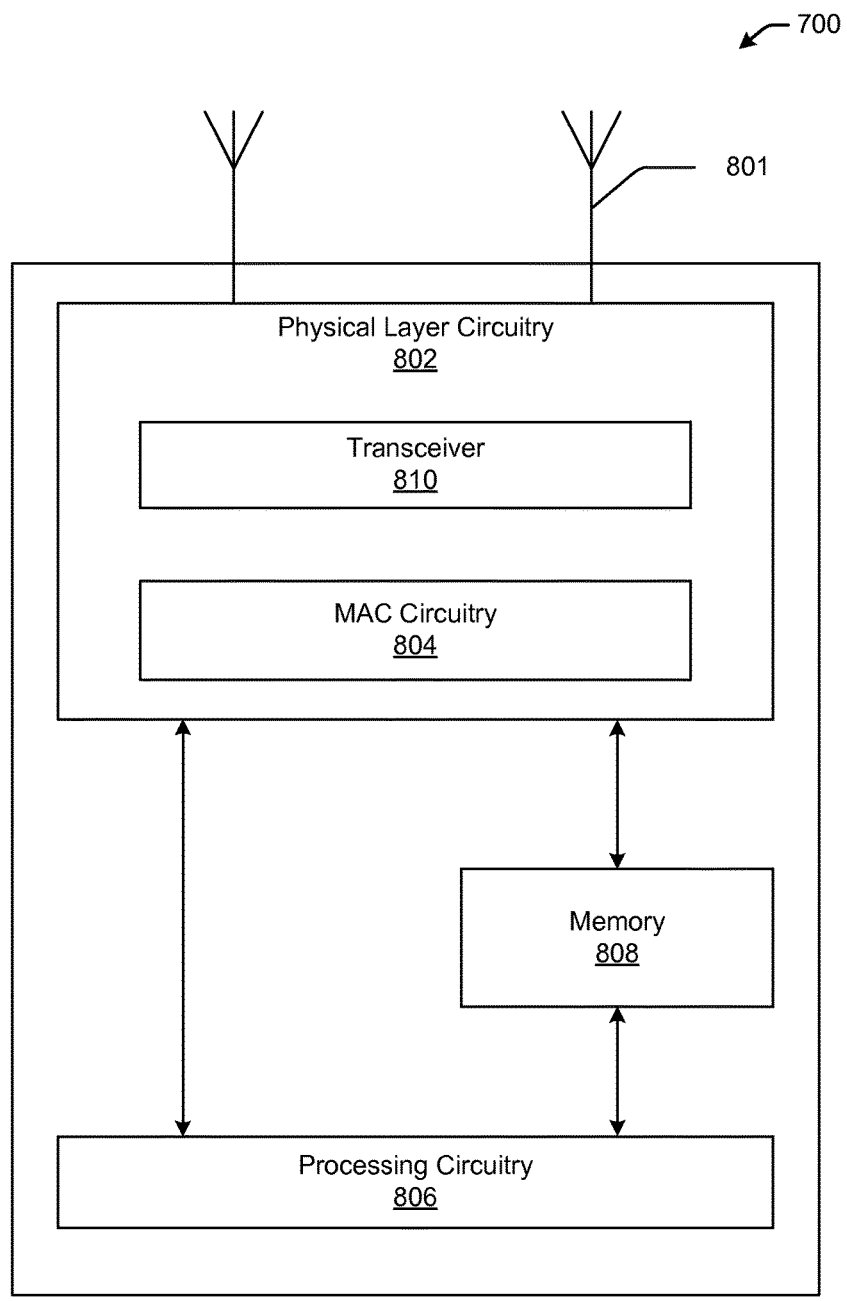
FIG. 7 illustrates a functional diagram of an example communication station or example access point, according to one or more example embodiments.

FIG. 7 shows a functional diagram of an exemplary communication station 700 in accordance with some embodiments. In one embodiment, FIG. 7 illustrates a functional block diagram of a communication station that may be suitable for use as an AP 102 (FIG. 1) or communication station STA 104 (FIG. 1) in accordance with some embodiments. The communication station 700 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 700 may include physical layer circuitry 802 having a transceiver 810 for transmitting and receiving signals to and from other communication stations using one or more antennas 801. The physical layer circuitry 802 may also include medium access control (MAC) circuitry 804 for controlling access to the wireless medium. The communication station 700 may also include processing circuitry 806 and memory 808 arranged to perform the operations described herein. In some embodiments, the physical layer circuitry 802 and the processing circuitry 806 may be configured to perform operations detailed in FIGS. 1-6.

In accordance with some embodiments, the MAC circuitry 804 may be arranged to contend for a wireless medium and configure frames or packets for communicating over the wireless medium and the physical layer circuitry 802 may be arranged to transmit and receive signals. The physical layer circuitry 802 may include circuitry for modulation/demodulation, upconversion/downconversion, filtering, amplification, etc. In some embodiments, the processing circuitry 806 of the communication station 700 may include one or more processors. In other embodiments, two or more antennas 801 may be coupled to the physical layer circuitry 802 arranged for sending and receiving signals. The memory 808 may store information for configuring the processing circuitry 806 to perform operations for configuring and transmitting message frames and performing the various operations described herein. The memory 808 may include any type of memory, including non-transitory memory, for storing information in a form readable by a machine (e.g., a computer). For example, the memory 808 may include a computer-readable storage device, read-only memory (ROM), random-access memory (RAM), magnetic disk storage media, optical storage media, flash-memory devices and other storage devices and media.

In some embodiments, the communication station 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 700 may include one or more antennas 801. The antennas 801 may include one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 700 may include one or more of a keyboard, a display, a non-volatile memory port, multiple antennas, a graphics processor, an application processor, speakers, and other mobile device elements. The display may be an LCD screen including a touch screen.

Although the communication station 700 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 700 may refer to one or more processes operating on one or more processing elements.

Certain embodiments may be implemented in one or a combination of hardware, firmware and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 700 may include one or more processors and may be configured with instructions stored on a computer-readable storage device memory.

Figure 8:
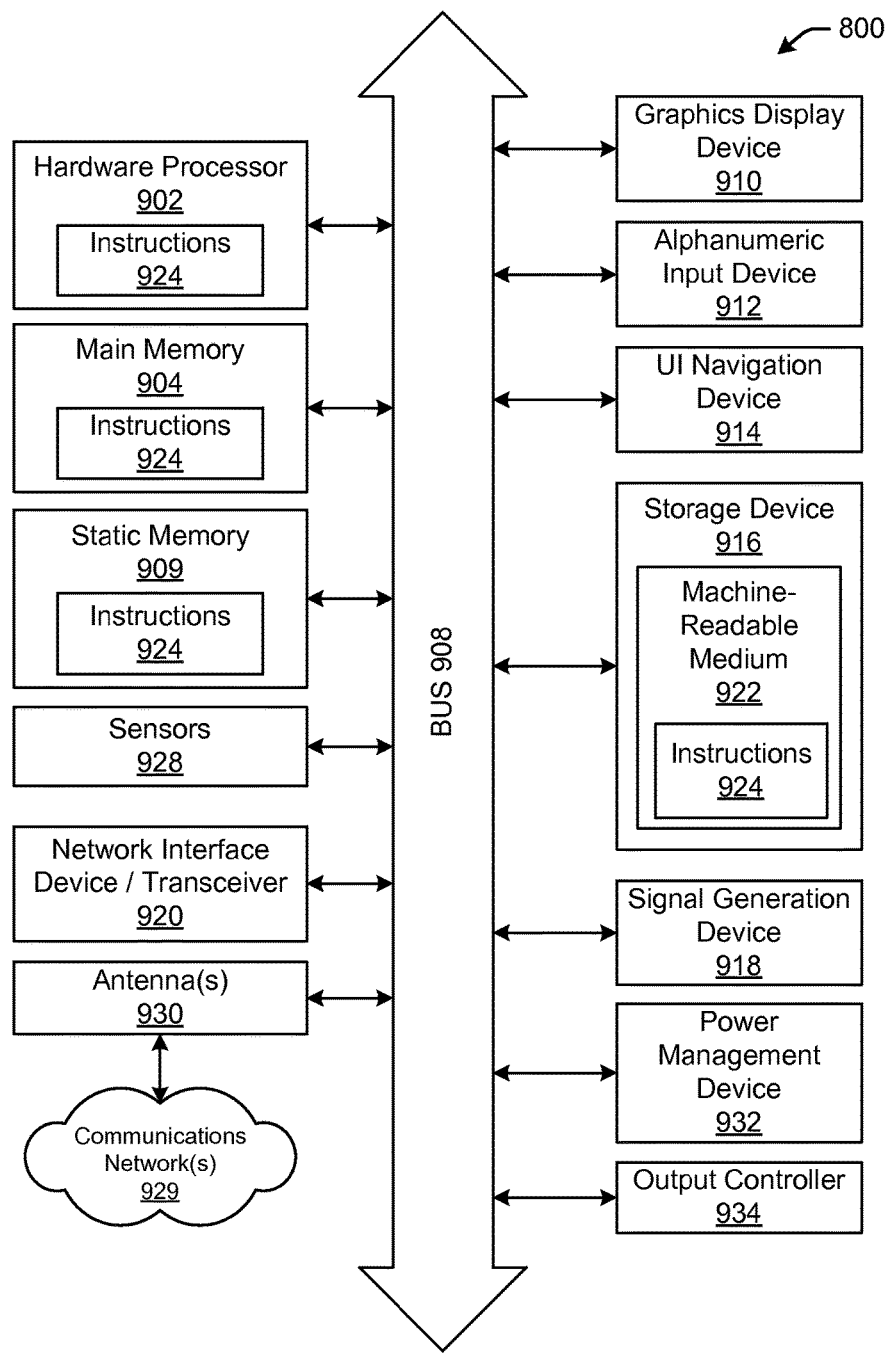
FIG. 8 shows a block diagram of an example of a machine upon which any of one or more techniques (e.g., methods) according to one or more embodiments discussed herein may be performed.

FIG. 8 illustrates a block diagram of an example of a machine 800 or system upon which any one or more of the techniques (e.g., methodologies) discussed herein may be performed. In other embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environments. The machine 800 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions, where the instructions configure the execution units to carry out a specific operation when in operation. The configuring may occur under the direction of the execution units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include a hardware processor 902 (e.g., a central processing unit (CPU), a graphics processing unit (GPU), a hardware processor core, or any combination thereof), a main memory 904 and a static memory 909, some or all of which may communicate with each other via an interlink (e.g., bus) 908. The machine 800 may further include a power management device 932, a graphics display device 910, an alphanumeric input device 912 (e.g., a keyboard), and a user interface (UI) navigation device 914 (e.g., a mouse). In an example, the graphics display device 910, alphanumeric input device 912 and UI navigation device 914 may be a touch screen display. The machine 800 may additionally include a storage device (i.e., drive unit) 916, a signal generation device 918 (e.g., a speaker), a network interface device/transceiver 920 coupled to antenna(s) 930, and one or more sensors 928, such as a global positioning system (GPS) sensor, compass, accelerometer, or other sensor. The machine 800 may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 800. In an example, one or any combination of the hardware processor 902, the main memory 904, the static memory 906, or the storage device 916 may constitute machine-readable media.

While the machine-readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium includes a machine-readable medium with a plurality of particles having resting mass. Specific examples of massed machine-readable media may include: non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 929 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 920 may include one or more physical jacks (e.g., Ethernet, coaxial, or phone jacks) or one or more antennas to connect to the communications network 926. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible media to facilitate communication of such software.

In one embodiment, an apparatus may include at least one memory storing computer-executable instructions; and at least one processor, wherein the at least one processor is configured to access the at least one memory and to execute the computer-executable instructions to determine a plurality of Orthogonal Frequency Division Multiplexing (OFDM) data symbol durations; generate a plurality of data streams by executing a plurality of sliding window operations using a respective shifting window for each of a plurality of OFDM data symbol durations associated with the plurality of OFDM data symbol durations, wherein a respective data stream of the plurality of data streams corresponds to a respective OFDM symbol duration of the plurality of OFDM symbol durations; dissect each of the plurality of the data streams into a respective plurality of segments using a respective OFDM symbol duration associated with the respective shifting window, wherein each segment of the respective plurality of segments is a vector; determine a plurality of vector sums corresponding to each of the plurality of data streams; and detect a Wi-Fi signal by using one of the plurality of vector sums.

In one aspect of an embodiment, a respective length for the respective shifting window for each of the plurality of OFDM symbol durations may be equal to the sum of a respective OFDM data symbol duration and a minimum length of a cyclic prefix (CP) associated with the respective OFDM data symbol duration. In one aspect of an embodiment, the plurality of sliding window operations may be executed in parallel and wherein each of the plurality of data streams may be dissected in parallel. In one aspect of an embodiment, each segment of the respective plurality of segments has a length equal to a respective CP length plus a respective OFDM data symbol duration. In one aspect of an embodiment, the at least one processor may be configured to access the at least one memory and to execute the computer-executable instructions to determine a plurality of CP lengths associated with a respective OFDM data symbol duration of a respective shifting window having a length equal to the respective OFDM data symbol duration and a minimum CP length associated with the respective OFDM data symbol duration; execute a jumping adder operation for each CP length of the plurality of CP lengths larger than the minimum CP length to generate a respective additional data stream corresponding to each CP length of the plurality of CP lengths larger than the minimum CP length; and dissect each respective additional data stream in to a respective plurality of segments using a duration equal to the CP length corresponding to the each respective additional data streams plus an associated OFDM data symbol duration. In one aspect of an embodiment, the at least one processor may be configured to access the at least one memory and to execute the computer-executable instructions to determine a required plurality of OFDM symbol durations for Wi-Fi signal detection based on an indication from an access point. In one aspect of an embodiment, the at least one processor may be configured to access the at least one memory and to execute the computer-executable instructions to detect Wi-Fi signals based on data streams previously obtained from a specific time duration; and adjust an inter-frame space (IFS) time for back-off based on the specific time duration. In one aspect of an embodiment, the apparatus may further comprise at least one transceiver. In one aspect of an embodiment, the apparatus may further comprise at least one antenna.

In one embodiment, a computer-readable non-transitory storage medium may be provided that comprises instructions, which when executed by one or more processors results in performing operations comprising determining a plurality of Orthogonal Frequency Division Multiplexing (OFDM) data symbol durations; generating a plurality of data streams by executing a plurality of sliding window operations using a respective shifting window for each of a plurality of OFDM data symbol durations associated with the plurality of OFDM data symbol durations, wherein a respective data stream of the plurality of data streams corresponds to a respective OFDM symbol duration of the plurality of OFDM symbol durations; dissecting each of the plurality of the data streams into a respective plurality of segments using a respective OFDM symbol duration associated with the respective shifting window, wherein each segment of the respective plurality of segments is a vector; determining a plurality of vector sums corresponding to each of the plurality of data streams; and detecting a Wi-Fi signal by using one of the plurality of vector sums.

In one aspect of an embodiment, a respective length for the respective shifting window for each of the plurality of OFDM symbol durations may be equal to the sum of a respective OFDM data symbol duration and a minimum length of a cyclic prefix (CP) associated with the respective OFDM data symbol duration. In one aspect of an embodiment, the plurality of sliding window operations may be executed in parallel and wherein each of the plurality of data streams may be dissected in parallel. In one aspect of an embodiment, each segment of the respective plurality of segments may have a length equal to a respective CP length plus a respective OFDM data symbol duration. In one aspect of an embodiment, the operations may further comprise determining a plurality of CP lengths associated with a respective OFDM data symbol duration of a respective shifting window having a length equal to the respective OFDM data symbol duration and a minimum CP length associated with the respective OFDM data symbol duration; executing a jumping adder operation for each CP length of the plurality of CP lengths larger than the minimum CP length to generate a respective additional data stream corresponding to each CP length of the plurality of CP lengths larger than the minimum CP length; and dissecting each respective additional data stream in to a respective plurality of segments using a duration equal to the CP length corresponding to each respective additional data stream plus an associated OFDM data symbol duration. In one aspect of an embodiment, the operations may further comprise determining a required plurality of OFDM symbol durations for Wi-Fi signal detection based on an indication from an access point. In one aspect of an embodiment, the operations may further comprise detecting Wi-Fi signals based on data streams previously obtained from a specific time duration; and adjusting an inter-frame space (IFS) time for back-off based on the specific time duration.

In one embodiment, a method may comprise determining a plurality of Orthogonal Frequency Division Multiplexing (OFDM) data symbol durations; generating a plurality of data streams by executing a plurality of sliding window operations using a respective shifting window for each of a plurality of OFDM data symbol durations associated with the plurality of OFDM data symbol durations, wherein a respective data stream of the plurality of data streams corresponds to a respective OFDM symbol duration of the plurality of OFDM symbol durations; dissecting each of the plurality of the data streams into a respective plurality of segments using a respective OFDM symbol duration associated with the respective shifting window, wherein each segment of the respective plurality of segments is a vector; determining a plurality of vector sums corresponding to each of the plurality of data streams; and detecting a Wi-Fi signal by using one of the plurality of vector sums.

In one aspect of an embodiment, a respective length for the respective shifting window for each of the plurality of OFDM symbol durations may be equal to the sum of a respective OFDM data symbol duration and a minimum length of a cyclic prefix (CP) associated with the respective OFDM data symbol duration. In one aspect of an embodiment, the plurality of sliding window operations may be executed in parallel and wherein each of the plurality of data streams may be dissected in parallel. In one aspect of an embodiment, each segment of the respective plurality of segments may have a length equal to a respective CP length plus a respective OFDM data symbol duration. In one aspect of an embodiment, the method may further comprise determining a plurality of CP lengths associated with a respective OFDM data symbol duration of a respective shifting window having a length equal to the respective OFDM data symbol duration and a minimum CP length associated with the respective OFDM data symbol duration; executing a jumping adder operation for each CP length of the plurality of CP lengths larger than the minimum CP length to generate a respective additional data stream corresponding to each CP length of the plurality of CP lengths larger than the minimum CP length; and dissecting each respective additional data stream in to a respective plurality of segments using a duration equal to the CP length corresponding to the each respective additional data stream plus an associated OFDM data symbol duration. In one aspect of an embodiment, the method may further comprise determining a required plurality of OFDM symbol durations for Wi-Fi signal detection based on an indication from an access point. In one aspect of an embodiment, the method may further comprise detecting Wi-Fi signals based on data streams previously obtained from a specific time duration; and adjusting an inter-frame space (IFS) time for back-off based on the specific time duration.

In one embodiment, a system may comprise at least one memory storing computer-executable instructions; and at least one processor, wherein the at least one processor is configured to access the at least one memory and to execute the computer-executable instructions to determine a plurality of Orthogonal Frequency Division Multiplexing (OFDM) data symbol durations; generate a plurality of data streams by executing a plurality of sliding window operations using a respective shifting window for each of a plurality of OFDM data symbol durations associated with the plurality of OFDM data symbol durations, wherein a respective data stream of the plurality of data streams corresponds to a respective OFDM symbol duration of the plurality of OFDM symbol durations; dissect each of the plurality of the data streams into a respective plurality of segments using a respective OFDM symbol duration associated with the respective shifting window, wherein each segment of the respective plurality of segments is a vector; determine a plurality of vector sums corresponding to each of the plurality of data streams; and detect a Wi-Fi signal by using one of the plurality of vector sums.

In one aspect of an embodiment, a respective length for the respective shifting window for each of the plurality of OFDM symbol durations may be equal to the sum of a respective OFDM data symbol duration and a minimum length of a cyclic prefix (CP) associated with the respective OFDM data symbol duration. In one aspect of an embodiment, the plurality of sliding window operations may be executed in parallel and wherein each of the plurality of data streams may be dissected in parallel. In one aspect of an embodiment, each segment of the respective plurality of segments has a length equal to a respective CP length plus a respective OFDM data symbol duration. In one aspect of an embodiment, the at least one processor may be configured to access the at least one memory and to execute the computer-executable instructions to determine a plurality of CP lengths associated with a respective OFDM data symbol duration of a respective shifting window having a length equal to the respective OFDM data symbol duration and a minimum CP length associated with the respective OFDM data symbol duration; execute a jumping adder operation for each CP length of the plurality of CP lengths larger than the minimum CP length to generate a respective additional data stream corresponding to each CP length of the plurality of CP lengths larger than the minimum CP length; and dissect each respective additional data stream in to a respective plurality of segments using a duration equal to the CP length corresponding to each respective additional data stream plus an associated OFDM data symbol duration. In one aspect of an embodiment, the at least one processor may be configured to access the at least one memory and to execute the computer-executable instructions to determine a required plurality of OFDM symbol durations for Wi-Fi signal detection based on an indication from an access point. In one aspect of an embodiment, the at least one processor may be configured to access the at least one memory and to execute the computer-executable instructions to detect Wi-Fi signals based on data streams previously obtained from a specific time duration; and adjust an inter-frame space (IFS) time for back-off based on the specific time duration.

In one embodiment, a system may comprise a means for determining a plurality of Orthogonal Frequency Division Multiplexing (OFDM) data symbol durations; a means for generating a plurality of data streams by executing a plurality of sliding window operations using a respective shifting window for each of a plurality of OFDM data symbol durations associated with the plurality of OFDM data symbol durations, wherein a respective data stream of the plurality of data streams corresponds to a respective OFDM symbol duration of the plurality of OFDM symbol durations; a means for dissecting each of the plurality of the data streams into a respective plurality of segments using a respective OFDM symbol duration associated with the respective shifting window, wherein each segment of the respective plurality of segments is a vector; a means for determining a plurality of vector sums corresponding to each of the plurality of data streams; and a means for detecting a Wi-Fi signal by using one of the plurality of vector sums.

In one aspect of an embodiment, a respective length for the respective shifting window for each of the plurality of OFDM symbol durations may be equal to the sum of a respective OFDM data symbol duration and a minimum length of a cyclic prefix (CP) associated with the respective OFDM data symbol duration. In one aspect of an embodiment, the plurality of sliding window operations may be executed in parallel and wherein each of the plurality of data streams may be dissected in parallel. In one aspect of an embodiment, each segment of the respective plurality of segments may have a length equal to a respective CP length plus a respective OFDM data symbol duration. In one aspect of an embodiment, the system may further comprise a means for determining a plurality of CP lengths associated with a respective OFDM data symbol duration of a respective shifting window having a length equal to the respective OFDM data symbol duration and a minimum CP length associated with the respective OFDM data symbol duration; a means for executing a jumping adder operation for each CP length of the plurality of CP lengths larger than the minimum CP length to generate a respective additional data stream corresponding to each CP length of the plurality of CP lengths larger than the minimum CP length; and a means for dissecting each respective additional data stream in to a respective plurality of segments using a duration equal to the CP length corresponding to each respective additional data stream plus an associated OFDM data symbol duration. In one aspect of an embodiment, the system may further comprise a means for determining a required plurality of OFDM symbol durations for Wi-Fi signal detection based on an indication from an access point. In one aspect of an embodiment, the system may further comprise a means for detecting Wi-Fi signals based on data streams previously obtained from a specific time duration; and a means for adjusting an inter-frame space (IFS) time for back-off based on the specific time duration.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Various embodiments of the disclosure may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can", "could", "might", or "may", unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

What is claimed is:

1. An apparatus comprising:
   at least one memory storing computer-executable instructions; and
   at least one processor, wherein the at least one processor is configured to access the at least one memory and to execute the computer-executable instructions to:
   determine a plurality of Orthogonal Frequency Division Multiplexing (OFDM) data symbol durations;
   generate a plurality of data streams by executing a plurality of sliding window operations, using a respective shifting window for each of the plurality of OFDM data symbol durations associated with the plurality of OFDM data symbol durations, wherein a respective data stream of the plurality of data streams corresponds to a respective OFDM data symbol duration of the plurality of OFDM data symbol durations;

determine a plurality of cyclic prefix (CP) lengths associated with the respective OFDM data symbol duration of the respective shifting window having a length equal to the respective OFDM data symbol duration and a minimum CP length associated with the respective OFDM data symbol duration;

dissect each of the plurality of the data streams into a respective plurality of segments, using the respective OFDM data symbol duration associated with the respective shifting window, wherein:
  each segment of the respective plurality of segments is a vector, and
  each segment is associated with a number of CP lengths corresponding to the OFDM data symbol duration of the respective shifting window, wherein the number of CP lengths is the number of the plurality of CP lengths;

determine a plurality of vector sums corresponding to each of the plurality of data streams; and detect a Wi-Fi signal by using one of the plurality of vector sums.

2. The apparatus of claim 1, wherein the respective length for the respective shifting window for each of the plurality of OFDM data symbol durations is equal to the sum of the respective OFDM data symbol duration and the minimum length of the CP associated with the respective OFDM data symbol duration.

3. The apparatus of claim 1, wherein the plurality of sliding window operations are executed in parallel and wherein each of the plurality of data streams are dissected in parallel.

4. The apparatus of claim 1, wherein each segment of the respective plurality of segments has a length equal to the respective CP length plus the respective OFDM data symbol duration.

5. The apparatus of claim 1, wherein the at least one processor is configured to access the at least one memory and to execute the computer-executable instructions to:
  execute a jumping adder operation for each CP length of the plurality of CP lengths larger than the minimum CP length to generate a respective additional data stream corresponding to each CP length of the plurality of CP lengths larger than the minimum CP length; and
  dissect each respective additional data stream in to a respective plurality of segments using a duration equal to the CP length corresponding to each of the respective additional data stream plus an associated OFDM data symbol duration.

6. The apparatus of claim 1, wherein the at least one processor is configured to access the at least one memory and to execute the computer-executable instructions to:
  determine a required plurality of OFDM data symbol durations for Wi-Fi signal detection based on an indication from an access point.

7. The apparatus of claim 1, wherein the at least one processor is configured to access the at least one memory and to execute the computer-executable instructions to:
  detect Wi-Fi signals based on data streams previously obtained from a specific time duration; and
  adjust an inter-frame space (IFS) time for back-off based on the specific time duration.

8. A computer-readable non-transitory storage medium that comprises instructions, which when executed by one or more processors result in performing operations comprising:
  determining a plurality of Orthogonal Frequency Division Multiplexing (OFDM) data symbol durations;
  generating a plurality of data streams by executing a plurality of sliding window operations, using a respective shifting window for each of the plurality of OFDM data symbol durations associated with the plurality of OFDM data symbol durations, wherein a respective data stream of the plurality of data streams corresponds to a respective OFDM data symbol duration of the plurality of OFDM data symbol durations;
  determining a plurality of cyclic prefix (CP) lengths associated with the respective OFDM data symbol duration of the respective shifting window having a length equal to the respective OFDM data symbol duration and a minimum CP length associated with the respective OFDM data symbol duration;
  dissecting each of the plurality of the data streams into a respective plurality of segments, using the respective OFDM data symbol duration associated with the respective shifting window, wherein:
    each segment of the respective plurality of segments is a vector, and
    each segment is associated with a number of CP lengths corresponding to the OFDM data symbol duration of the respective shifting window, wherein the number of CP lengths is the number of the plurality of CP lengths;
  determining a plurality of vector sums corresponding to each of the plurality of data streams; and
  detecting a Wi-Fi signal by using one of the plurality of vector sums.

9. The computer-readable non-transitory storage medium of claim 8, wherein the respective length for the respective shifting window for each of the plurality of OFDM data symbol durations is equal to the sum of the respective OFDM data symbol duration and the minimum length of the CP associated with the respective OFDM data symbol duration.

10. The computer-readable non-transitory storage medium of claim 8, wherein the plurality of sliding window operations are executed in parallel and wherein each of the plurality of data streams are dissected in parallel.

11. The computer-readable non-transitory storage medium of claim 8, wherein each segment of the respective plurality of segments has a length equal to the respective CP length plus the respective OFDM data symbol duration.

12. The computer-readable non-transitory storage medium of claim 8, wherein the operations further comprise:
  executing a jumping adder operation for each CP length of the plurality of CP lengths larger than the minimum CP length to generate a respective additional data stream corresponding to each CP length of the plurality of CP lengths larger than the minimum CP length; and
  dissecting each respective additional data stream in to a respective plurality of segments using a duration equal to the CP length corresponding to each of the respective additional data stream plus an associated OFDM data symbol duration.

13. The computer-readable non-transitory storage medium of claim 8, wherein the operations further comprise:
  determining a required plurality of OFDM data symbol durations for Wi-Fi signal detection based on an indication from an access point.

14. The computer-readable non-transitory storage medium of claim 8, wherein the operations further comprise:
  detecting Wi-Fi signals based on data streams previously obtained from a specific time duration; and adjusting an inter-frame space (IFS) time for back-off based on the specific time duration.

15. A method, comprising:

determining a plurality of Orthogonal Frequency Division Multiplexing (OFDM) data symbol durations;

generating a plurality of data streams by executing a plurality of sliding window operations, using a respective shifting window for each of the plurality of OFDM data symbol durations associated with the plurality of OFDM data symbol durations, wherein a respective data stream of the plurality of data streams corresponds to a respective OFDM data symbol duration of the plurality of OFDM data symbol durations;

determining a plurality of cyclic prefix (CP) lengths associated with the respective OFDM data symbol duration of the respective shifting window having a length equal to the respective OFDM data symbol duration and a minimum CP length associated with the respective OFDM data symbol duration;

dissecting each of the plurality of the data streams into a respective plurality of segments, using the respective OFDM data symbol duration associated with the respective shifting window, wherein:

each segment of the respective plurality of segments is a vector, and each segment is associated with a number of CP lengths corresponding to the OFDM data symbol duration of the respective shifting window, wherein the number of CP lengths is the number of the plurality of CP lengths;

determining a plurality of vector sums corresponding to each of the plurality of data streams; and detecting a Wi-Fi signal by using one of the plurality of vector sums.

16. The method of claim 15, wherein the respective length for the respective shifting window for each of the plurality of OFDM data symbol durations is equal to the sum of the respective OFDM data symbol duration and the minimum length of the CP associated with the respective OFDM data symbol duration.

17. The method of claim 15, wherein the plurality of sliding window operations are executed in parallel and wherein each of the plurality of data streams are dissected in parallel.

18. The method of claim 15, wherein each segment of the respective plurality of segments has a length equal to the respective CP length plus the respective OFDM data symbol duration.

19. The method of claim 15, further comprising:

executing a jumping adder operation for each CP length of the plurality of CP lengths larger than the minimum CP length to generate a respective additional data stream corresponding to each CP length of the plurality of CP lengths larger than the minimum CP length; and dissecting each respective additional data stream in to a respective plurality of segments using a duration equal to the CP length corresponding to each of the respective additional data stream plus an associated OFDM data symbol duration.

20. The method of claim 15, further comprising:

determining a required plurality of OFDM data symbol durations for Wi-Fi signal detection based on an indication from an access point.

* * * * *